No. 612,778. Patented Oct. 18, 1898.
W. G. MacLAUGHLIN.
AUTOMATIC AIR BRAKE.
(Application filed Jan. 15, 1897.)

(No Model.) 7 Sheets—Sheet 1.

Witnesses

Inventor
W. G. MacLaughlin
By Alexander & Davis
Attorneys

No. 612,778. Patented Oct. 18, 1898.
W. G. MacLAUGHLIN.
AUTOMATIC AIR BRAKE.
(Application filed Jan. 15, 1897.)
(No Model.) 7 Sheets—Sheet 2.
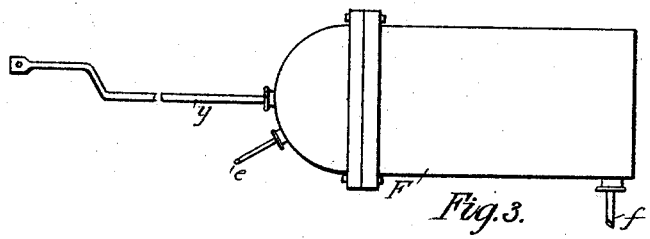
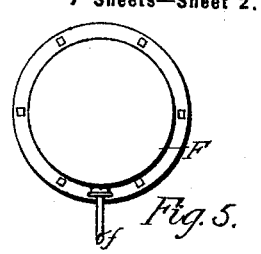
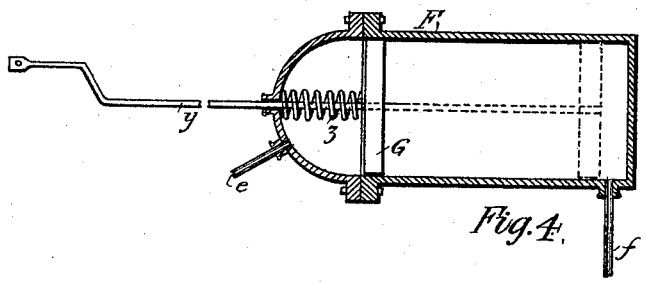
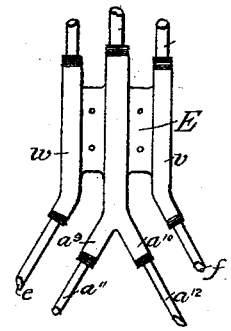
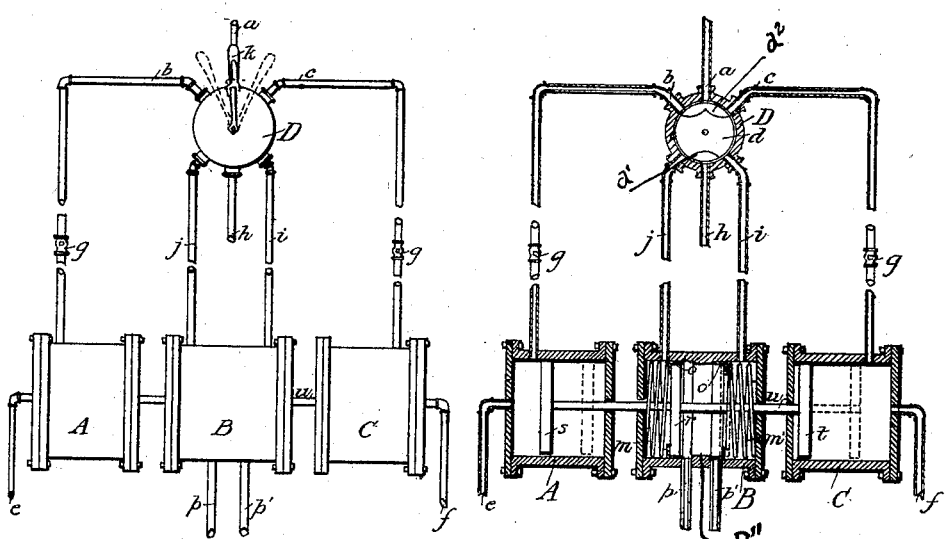

No. 612,778. Patented Oct. 18, 1898.
W. G. MacLAUGHLIN.
AUTOMATIC AIR BRAKE.
(Application filed Jan. 15, 1897.)
(No Model.) 7 Sheets—Sheet 3.

Witnesses
Frank S. Rea
W. Lichtenberg

Inventor
William G. MacLaughlin
By Alexander & Davis
Attys.

No. 612,778.  
W. G. MacLAUGHLIN.  
AUTOMATIC AIR BRAKE.  
(Application filed Jan. 15, 1897.)  
(No Model.)  
Patented Oct. 18, 1898.

7 Sheets—Sheet 4.

Witnesses  
Frank B. Rea.  
W. Lichtenberg.

Inventor  
William G. MacLaughlin  
by Alexander & Davis  
Atty's.

No. 612,778. Patented Oct. 18, 1898.
W. G. MacLAUGHLIN.
AUTOMATIC AIR BRAKE.
(Application filed Jan. 15, 1897.)

(No Model.) 7 Sheets—Sheet 5.

Witnesses
Frank S. Rea.

Inventor
William G. MacLaughlin
By Alexander & Davis
Attys.

THE NORRIS PETERS CO., PHOTO-LITHO., WASHINGTON, D. C.

No. 612,778. Patented Oct. 18, 1898.
W. G. MacLAUGHLIN.
AUTOMATIC AIR BRAKE.
(Application filed Jan. 15, 1897.)
(No Model.) 7 Sheets—Sheet 6.
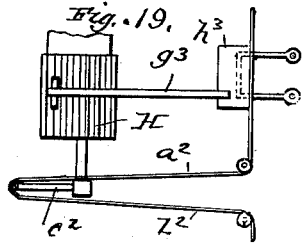
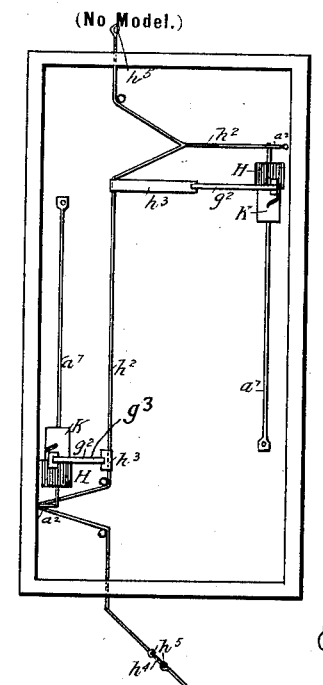
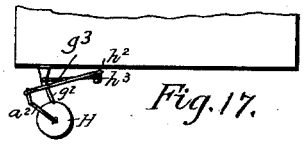
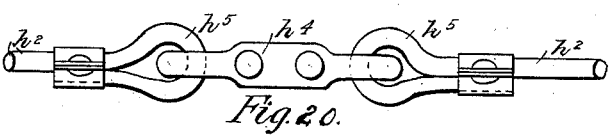
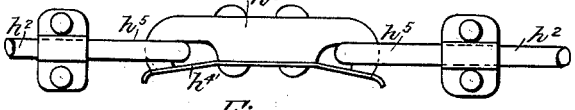
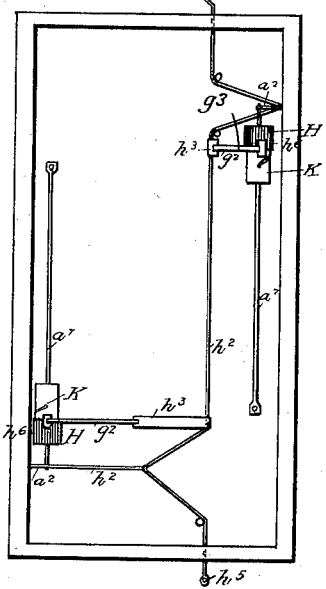
Witnesses
Frank S. Rea.
Inventor
William G. MacLaughlin
by Alexander & Davis
Attys.

No. 612,778. Patented Oct. 18, 1898.
W. G. MacLAUGHLIN.
AUTOMATIC AIR BRAKE.
(Application filed Jan. 15, 1897.)
(No Model.) 7 Sheets—Sheet 7.
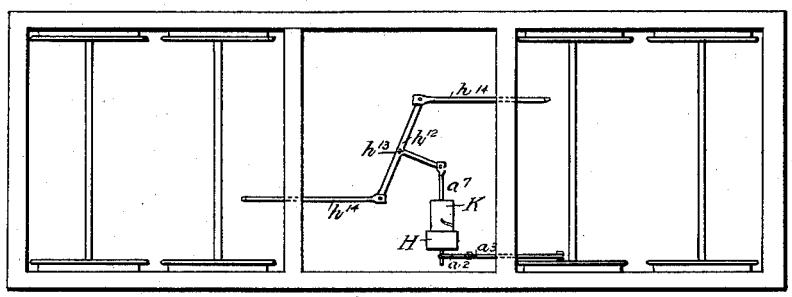
Fig. 22.
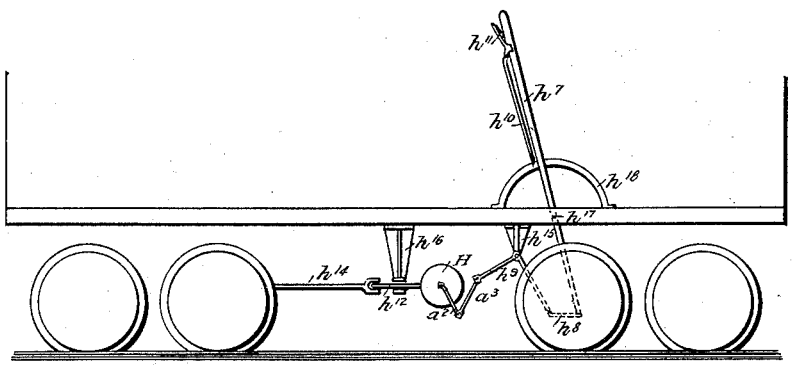
Fig. 23.
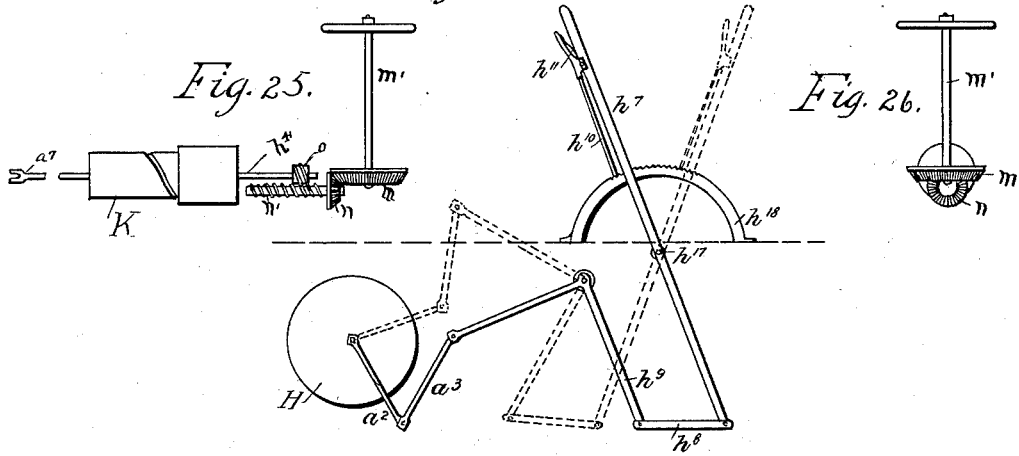
Fig. 25. Fig. 26.
Fig. 24.
Fig. 27.
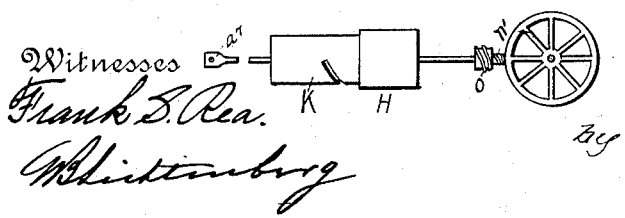
Witnesses
Frank S. Rea.
Inventor
William G. MacLaughlin
by Alexander & Davis
attys.

UNITED STATES PATENT OFFICE.

WILLIAM G. MacLAUGHLIN, OF KANSAS CITY, MISSOURI, ASSIGNOR TO THE MacLAUGHLIN MANUFACTURING COMPANY, OF OMAHA, NEBRASKA.

AUTOMATIC AIR-BRAKE.

SPECIFICATION forming part of Letters Patent No. 612,778, dated October 18, 1898.

Application filed January 15, 1897. Serial No. 619,386. (No model.)

*To all whom it may concern:*

Be it known that I, WILLIAM G. MACLAUGHLIN, a citizen of the United States, residing at Kansas City, in the county of Jackson and State of Missouri, have invented certain new and useful Improvements in Automatic Air-Brakes, of which the following is a specification, reference being had therein to the accompanying drawings, in which—

Figure 1:
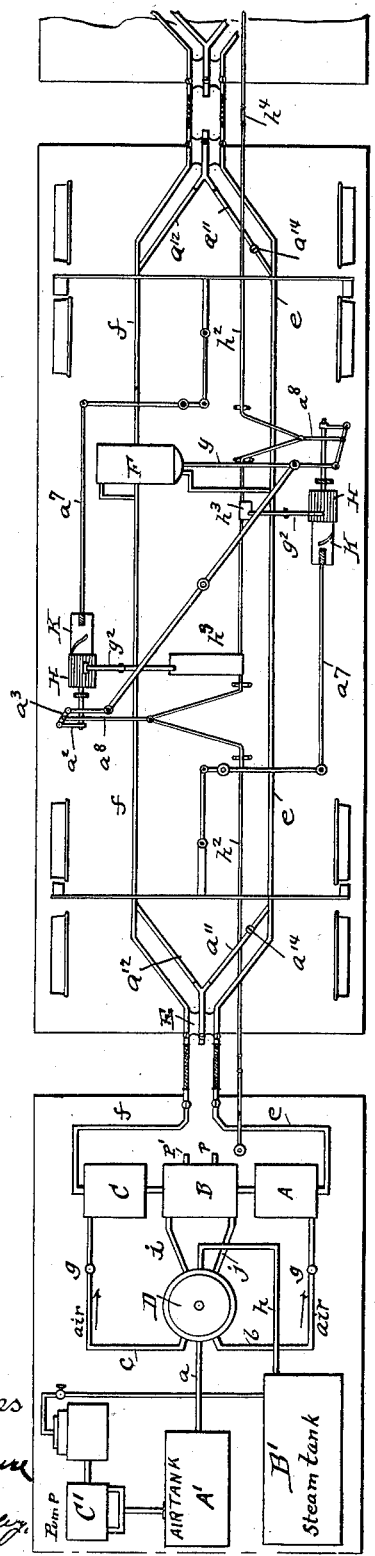
Figure 2:
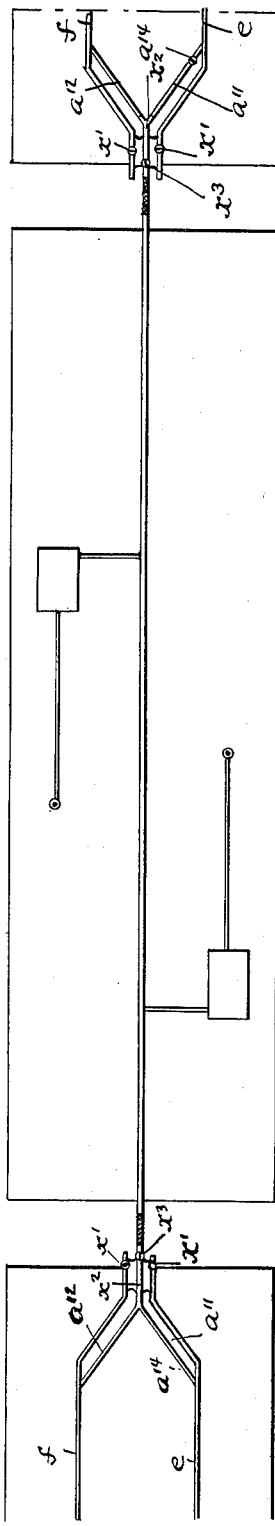
Figure 6:
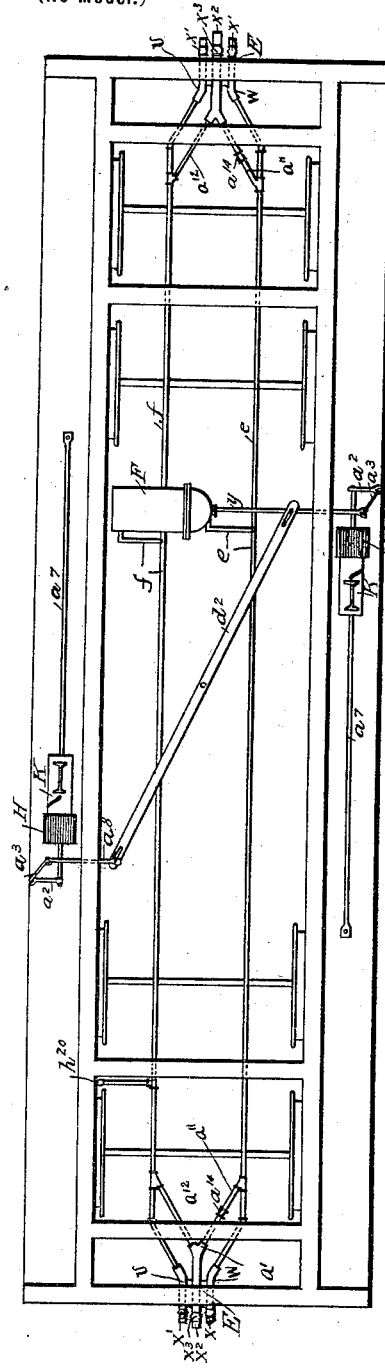
Figure 7:
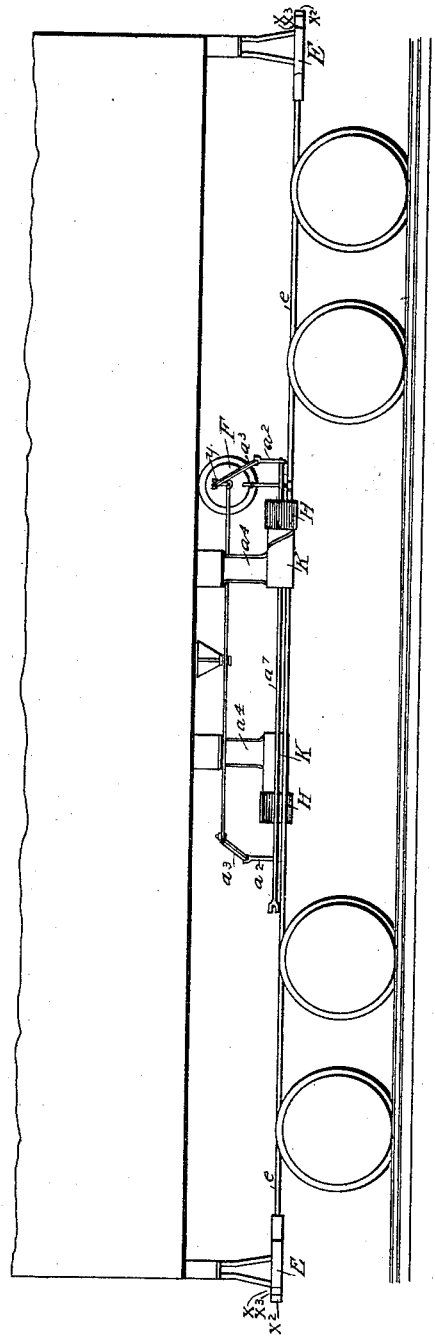
Figure 8:
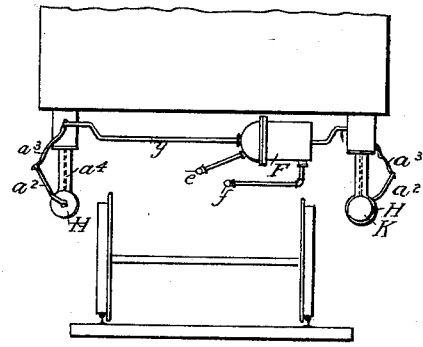
Figure 9:
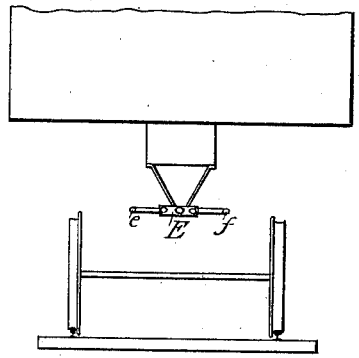
Figure 10:
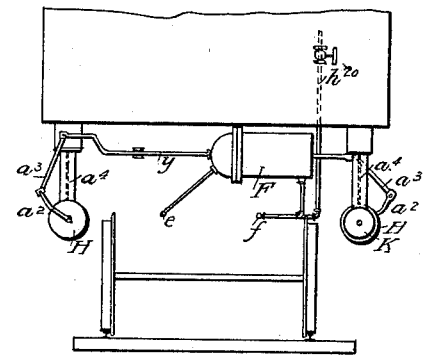
Figure 11:
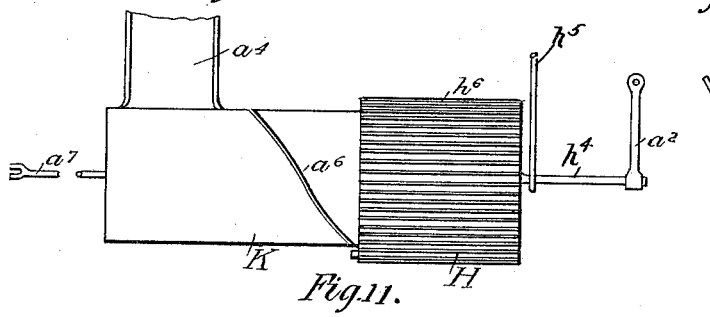
Figure 13:
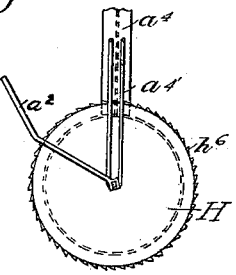
Figure 12:
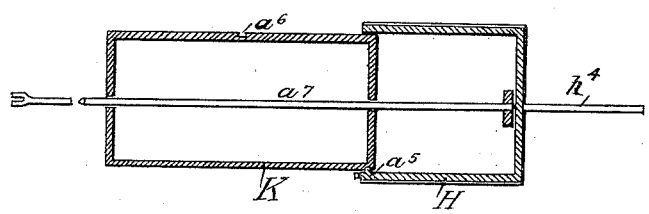
Figure 14:
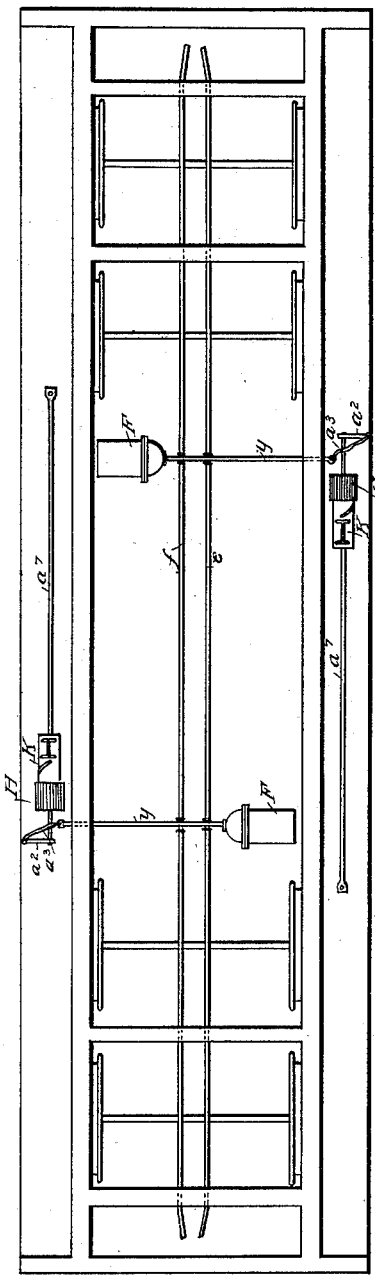
Figure 15:
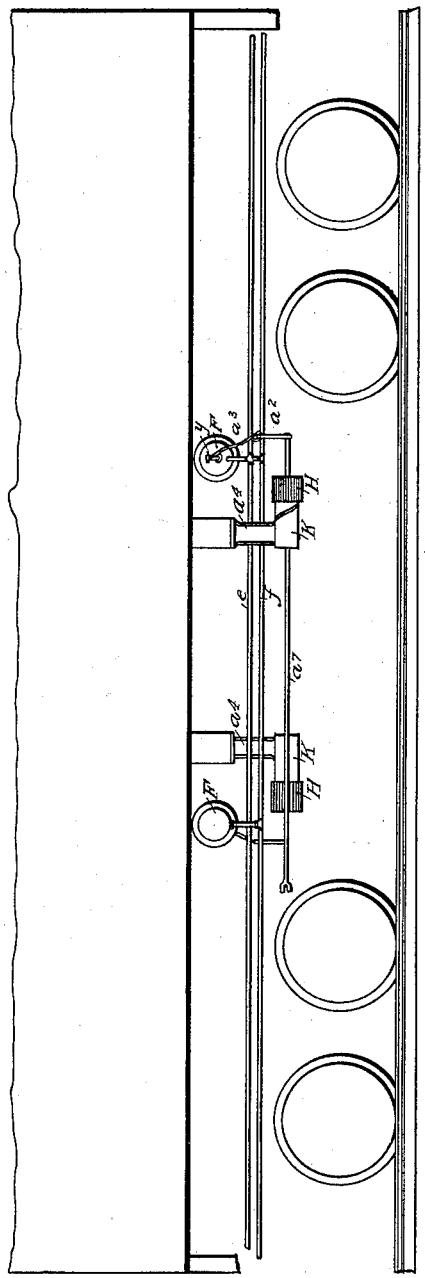

Figure 1 is a bottom plan view showing the position of the various parts upon the engine and one connected car. Fig. 2 is a similar view showing the mechanism connected to a car having an ordinary brake mechanism which is operated by exhausting the air from the pipes thereof. Fig. $1^a$ is a detail sectional view of the steam-cylinder, air-cylinders, and engineer's valve carried by the engine. Fig. $2^a$ is an elevation of the same. Figs. 3, 4, and 5 are details of the brake-operating cylinder carried by each car. Fig. $5^a$ is a detail of the air-pipe coupling. Fig. 6 is a bottom view of a car, showing the mechanism in position. Fig. 7 is a side elevation thereof. Fig. 8 is an end view showing the brake-applying mechanism. Fig. 9 is a similar view showing the coupler which is used when the mechanism is coupled to cars having other forms of air-brakes. Fig. 10 is an end view showing means for applying the brakes from a car. Figs. 11, 12, and 13 are detail views of the rotary cap which applies the brake. Fig. 14 is a bottom view of a car, showing another form of the apparatus. Fig. 15 is a side elevation thereof. Fig. 16 is a bottom view showing an automatic safety-brake-applying mechanism. Fig. 17 is a detail of the safety-brake. Fig. 18 is a detail end view of the cap H and lever $g^2$. Fig. 19 is a plan view of the cap H, lever $g^2$, and part of cable $h^2$. Figs. 20 and 21 are views of the means for connecting the safety-brake between the cars. Figs. 22 and 23 are a bottom and an end view, respectively, of a lever mechanism for operating the brakes. Fig. 24 is a detail of the lever mechanism. Figs. 25, 26, and 27 are detail views of a screw mechanism for operating the brakes.

This invention relates to fluid-pressure brakes for railway-cars; and it has for its main objects to provide an apparatus by means of which the brakes on all the cars may be positively applied or positively released simultaneously by the engineer in his cab, the actuating fluid being forced through the apparatus by a suitable means controlled and actuated by a power other than that of the fluid which it forces through the apparatus, to provide mechanism whereby the cars fitted with this brake may be coupled with cars having other air-brake mechanisms, and to provide a safety-brake which will be automatic in its operation should the cars of the train be accidentally disconnected. Other objects of the invention will hereinafter appear.

Referring to the various parts by letters, A' designates an air-reservoir, which may be located upon the engine or tender at any suitable point; B', a steam reservoir or generator, which may be the engine-boiler or other reservoir, carried in any suitable position on the engine; C', an air-pump, which is connected to compress air in the air-reservoir.

Upon the engine, preferably within the cab and within convenient reach of the engineer, is a valve-casing D, containing a rotary circular valve $d$, which shall be hereinafter designated as the "engineer's" valve. Connecting the air-reservoir to the valve-casing D is a pipe $a$, and a pipe $h$ connects the steam-reservoir to the opposite side of the said casing. From the casing D and on opposite sides and close to the pipe $a$ project two air-pipes $b$ and $c$. These pipes $b$ and $c$ lead to the outer ends of cylinders A and C, respectively. These cylinders are supported upon the engine in a suitable position and are axially in line with each other, and between them is supported a steam-cylinder B, which is axially in line with them.

Within air-cylinder A is a piston $s$. Within cylinder B is a piston $r$. Within cylinder C is a piston $t$. These are all mounted upon a piston-rod $u$, as shown in Fig. $1^a$.

Connected to the valve-casing D, one on each side of the steam-pipe $h$ and close thereto, are steam-pipes $i$ and $j$, one of said pipes, $i$, being connected to the steam-cylinder at the end joining air-cylinder C, and the other, $j$, being connected to the end of the steam-cylinder adjoining air-cylinder A. The rotary valve $d$ is formed with a passage $d'$, which is adapted to connect pipe $h$ with pipe $j$ or with pipe $i$, according to the position of the valve. This valve is also formed with a passage $d^2$, which is adapted to put pipe $a$ in communication with pipes $b$ and $c$. The passages in the valve are so arranged that when pipe $h$ is in communication with pipe $i$ pipe $a$ will be in communication with pipe $b$, and when $h$ is connected to $j$, $a$ will be connected to $c$. To the stem of valve $d$ is secured a lever $k$, by means of which the valve is rotatable. Any suitable means may be provided for holding the lever in its proper positions. Air-pipes $b$ and $c$ are each provided with a check-valve $g$, which prevents air passing from the air-cylinders back to the valve D.

The steam-cylinder B is formed with a slightly-reduced inner central portion B''. Against the shoulders formed by this enlargement fit rings $o$ and $o'$, each of which is formed with an inwardly-extending annular flange. Between these flanges and the adjacent ends of the steam-cylinder are confined coil-springs $m$ and $m'$, which normally hold the rings against the shoulders. Adjacent these shoulders and normally closed by the rings $o$ and $o'$ are exhaust-ports $p$ and $p'$.

From the outer ends of cylinder A, which is the brake-applying cylinder, leads an air-pipe $e$, and from the outer end of cylinder C, which is the brake-releasing cylinder, leads an air-pipe $f$. Pipe $e$ is connected to a pipe $w$ and pipe $f$ is connected to a pipe $v$ of a coupling E, which is mounted at the end of the vehicle which carries the cylinders. The pipes $v$ and $w$ are each provided with a valve $x'$. These pipes are connected by a hose connection with corresponding pipes upon the adjacent car. Pipes $e$ and $f$ connect the couplings E at each end of the car, said pipes running under the car, as shown in Figs. 6 and 14.

Supported from the car and extending transversely thereof is a brake-cylinder F, within which is a piston G, carrying a piston-rod $y$, which extends inwardly through the cylinder-head. The pipes $e$ and $f$ are connected to the cylinder F on opposite sides of the piston G. To the outer end of the piston $y$ is connected the brake mechanism, said mechanism being of such form that by the inward movement of said piston the brakes will be applied and by the outward movement thereof the brakes will be released. Surrounding the piston-rod $y$ within the cylinder E and bearing against the end nearest the inlet of pipe $e$ is a coil-spring $z$, which cushions the outward stroke of the piston G.

The operation of this part of the mechanism is as follows: The engineer's valve is placed in the position shown in Fig. 1$^a$, in which position steam is cut off from cylinder B and the air-reservoir A' is put in communication with cylinders A and C and through them with the pipes on the cars. Air is now forced into reservoir A' until the pressure therein and in the pipes of the cars is as great as desired. When the brakes are to be applied, the valve $d$ is rotated sufficiently to put steam-pipe $h$ into connection with pipe $i$, closing air-pipe $c$ and steam-pipe $j$. The pistons now move to the left in Fig. 1$^a$, and the air in cylinder A will be forced into pipes $e$ of the system, and the air in pipes $f$ will be expanded into the cylinder C. In this way the pressure in pipes $e$ will be considerably increased over the pressure in pipes $f$. Consequently pistons G in cylinder F will be forced inwardly, thereby applying the brakes. As piston $r$ in the steam-cylinder passes the enlargement B'' it engages the flange of ring $o$ and carries the ring with it and compresses spring $m$. As the ring moves away from the enlargement it uncovers the exhaust $p$ and permits the steam to escape.

To hold the brakes in their applied position, the engineer's valve may be held open, or it may be closed to permit the ring $o$ to settle back sufficiently to close the exhaust-ports. In this latter position the steam in the cylinder will hold the brakes in their applied position. Should the brakes loosen up too much, the engineer's valve may again be opened and a fresh supply of steam admitted to cylinder B. To release the brakes, the action of the engineer's valve and pistons is reversed. Air from the reservoir passes into the pipes $e$ and $f$ whenever the pressure in them becomes less than the pressure in the reservoir. The valve $g$ prevents air passing into the reservoir as the pistons move back and forth. It will be seen that the brakes are applied by a fluid under pressure and that said fluid is moved through the pipes and caused to perform its work by an independent motive power.

To the outer end of the piston-rod $y$ of each cylinder F is connected a lever $a^3$, which is connected to a lever $a^2$. The other end of this lever $a^2$ is rigidly connected to a horizontal rotatable rod $h^4$, which is supported in a hanger $a^5$ from the bottom of the car. Secured rigidly to the end of the rotatable rod $h^4$ is an elongated cylindrical cap H, which has formed on its outer surface ratchet-teeth $h^6$, which extend the entire length of the cap. Fitting within the cap H is a cylinder K, which is supported by hanger $a^4$ and is formed with a spiral groove $a^6$ in its outer surface. Extending inwardly from the forward edge of the cap H is a lug $a^5$, which fits within the groove $a^6$ of the cylinder K. Extending horizontally through the cylinder and projecting into cap H is a horizontal rod $a^7$, whose end within cap H bears against the solid end thereof. The outer end of this rod $a^7$ is connected to the brake-lever of an ordinary or any desired form of brake.

The operation of this portion of the mechanism is as follows: When the air or fluid pressure is increased in the brake-pipe $e$ and reduced in the pipes $f$, the piston in cylinder F is forced inward and the cap H, through its connection with piston-rod $y$, is rotated and lug $a^5$ advanced along groove $a^6$, the rod $a^7$ is forced outward, and the brakes applied. When this operation is reversed, the cap is rotated in the opposite direction and lug $a^5$ travels back in groove $a^6$ and the brake is released. When it is desired to work more than one set of brakes upon a car, I may pivot a long lever $d^2$ to the under side of the car, as shown in Fig. 6, and pivot one end to piston-rod $y$. To its other end is secured a lever $a^8$, which in turn is secured to lever $a^3$ of the second brake-applying mechanism, consisting of a cap H, cylinder K, and rod $a^7$. Thus the movement of the piston is communicated to two sets of brake-applying mechanism. However, if it be desired, a cylinder F and a brake-applying mechanism may be supplied for each set of brakes, as shown in Fig. 14.

To apply the brake automatically in the event of a coupling breaking or becoming accidentally disconnected, a safety-brake-operating mechanism is provided. This mechanism consists of a cable $h^2$, mounted in suitable hangers to the bottom of each car and diverted from its straight course and connected to the lever $a^2$ at such points of diversion. At a point adjacent the cap H a horizontal plate $h^3$ is secured to and moves longitudinally with such cable. Resting upon this plate is the end of a horizontal arm $g^3$ of a pivoted ratchet $g^2$, which is supported in a hanger from the bottom of the car. The plates $h^3$ are secured to the cable and are held in a horizontal position by suitable brackets carried by the car. These brackets hold the plates in a horizontal position during their reciprocation. The ratchets $g^2$ are pivoted upon the bottom of the car and are provided with arms $g^3$, whose free ends rest upon the plates $h^3$. When the arm $g^3$ is resting on this plate, the pawl $g^2$ is held out of engagement with the teeth of cap H and just above them. This ratchet is by this plate normally held out of engagement with the teeth of the cap H.

To connect the cable of one car with the cable of the next car, a double snap $h^4$ is employed. This snap is of such construction that it is weaker than the cable and yet strong enough to apply the brakes with sufficient force before breaking. Should the train become disconnected at any point, the cable will be drawn taut and at each point of diversion will endeavor to straighten, thus pulling on the levers $a^2$ and rotating cap H and applying the brakes. As the cable moves longitudinally the plates $h^3$ are withdrawn from the arms of ratchets $g^2$, and said ratchets are dropped upon the caps H and, engaging the teeth thereof, hold the brakes in their applied position. The plates $h^3$ are of such length that the brakes will be applied with sufficient force before the ratchet-arms are released therefrom. The snaps $h^4$ being of less strength than the cable will break before the cable, and thereby prevent any serious rupture of the mechanism.

To enable the conductor or any one upon the train to apply the brakes from any coach or car of the train, a pipe $h^2$ (shown in Fig. 15) is connected to the pipe $f$ of each car and extended into the car. A suitable valve is placed therein, by means of which the air from pipes $f$ may be exhausted whenever desired. It is evident that by exhausting pipes $f$ the brakes will be applied by the air in pipes $e$ expanding into cylinder F.

The brake-applying mechanism may be operated by manual power, if desired. In Figs. 25, 26, and 27 is illustrated one means of accomplishing this. Upon the end of the rod $h^4$ is secured a worm-gear $o$, and meshing therewith is a worm $n'$. Upon worm-shaft $n'$ is secured a beveled wheel $n$, which is driven by a gear $m$, secured to a vertical shaft $m'$. Upon the upper end of this shaft is mounted a hand-wheel, by means of which the mechanism may be driven. The operation of this mechanism is obvious.

In order that the brake mechanism may be operated quickly by hand-power, if desired, I secure to link $a^3$ one arm of a bell-crank lever $h^9$. To the other arm of this lever is connected a link $h^8$, which is pivoted to the lower end of a hand-lever $h^7$. This lever projects up within the car, and a ratchet-segment $h^{18}$ is secured in position to be engaged by a spring-ratchet $h^{10}$, carried by the lever $h^7$ and adapted to be operated in the usual way by a lever $h^{11}$. It will be readily seen that by operating lever $h^7$ cap H may be rotated in either direction and the brakes applied or released, as desired.

In order to adapt this brake mechanism to be connected to a mechanism wherein the brakes are applied by exhausting the air from the pipes thereof, a central pipe $x^2$ is mounted in each coupling E, and a valve $x^3$ is placed in said pipe, as shown in Fig. 2, and at its inner end this pipe is forked, and pipes $a^{11}$ and $a^{12}$ are connected thereto. Pipe $a^{11}$ is connected to brake-applying pipe $e$, and pipe $a^{12}$ is connected to brake-releasing pipe $f$. In pipe $a^{11}$ is placed a check-valve $a^{14}$, which prevents air from passing from train-pipe $e$. In operating this portion of the mechanism the valves $x'$ in the coupling adjacent the car with the odd form of brake mechanism are closed and connection is made through the central pipe $x^2$, whose valve $x^3$ is opened.

To apply the brakes upon all the cars, the air is compressed in the pipes $e$ and exhausted in pipes $f$ in the usual way. Upon all cars between the odd car and the engine the brakes will be operated in the usual manner. As the air is exhausted from pipes $f$ it is also drawn from the mechanism on the odd car through the pipe $a^{12}$ and the brakes applied by creating a partial vacuum in said pipes. On all cars which may be attached to the end of the odd car (said odd car being in the middle of the train) the brakes are operated by the air in the pipes $e$ expanding into cylinder F as the air in pipes $f$ is exhausted through pipes $a^{12}$ and the pipes of the odd brake mechanism. When the brakes are released, the air-pressure is increased in pipe $f$ and through pipes $a^{12}$ in the pipes of the odd mechanism, thereby releasing the brakes upon all the cars. In case the train should break in two the air in pipes $f$ would exhaust and the air in pipes $e$ would expand into cylinders F and apply the brakes. Check-valve $a^{14}$ would prevent the escape of the air in pipes $e$.

Having thus fully described my invention, what I claim, and desire to secure by Letters Patent, is—

1. In a fluid-pressure brake the combination of a brake mechanism, means operated by fluid-pressure for actuating said mechanism to apply or release the brakes, said mechanism applying the brakes when the fluid is moved in one direction through the mechanism, and releasing them when it is moved in the other direction, means for maintaining fluid under pressure through said actuating mechanism, and means for moving said fluid through said mechanism in either direction, whereby the brakes may be applied or released without releasing any portion of the fluid from the brake mechanism, substantially as described.

2. In a fluid-pressure brake the combination of a brake-cylinder carried by the car, a piston therein, a brake mechanism connected thereto, a set of pipes connected to said cylinder on each side of the piston, means for normally maintaining a fluid under an equal pressure in both of said sets of pipes and in the brake-cylinder, and means for increasing the fluid-pressure on one side of the piston and for reducing it on the other side without releasing the fluid under pressure from the apparatus, substantially as described.

3. In a fluid-pressure brake the combination of a brake-cylinder carried by a car, a piston therein, a brake mechanism connected to said piston and operated by its reciprocation, two independent sets of pipes connected to said cylinder, one set being connected on each side of the piston, means for normally maintaining a fluid under an equal pressure in all the pipes and in the brake-cylinder, and a steam-actuated mechanism for increasing the pressure on either side of the brake-cylinder and for reducing it on the other side without releasing the fluid from the apparatus, whereby the brakes may be positively applied or released by the fluid-pressure, substantially as described.

4. In a fluid-pressure brake the combination of a brake-cylinder, a piston therein, a brake mechanism connected thereto, two independent sets of pipes connected to said cylinder one on each side of the piston, an independent cylinder connected to each set of pipes, a piston in each cylinder, means for connecting said pistons together, means for reciprocating said pistons, and means for maintaining a fluid under pressure in the pipes and the brake-cylinders, substantially as described.

5. In a fluid-pressure brake the combination of a brake mechanism adapted to release and apply brakes by a positive fluid-pressure, with means for operating said mechanism, said means consisting of a pair of fluid-pressure cylinders, a piston in each cylinder, a steam-cylinder between said fluid-pressure cylinders, a piston in said steam-cylinder, a piston-rod connecting all of said pistons, means for admitting steam to the steam-cylinder on either side of the piston, means for supplying fluid under an equal pressure to the fluid-pressure cylinders, and means for connecting the fluid-pressure cylinders with the brake mechanism, substantially as described.

6. In a fluid-pressure brake mechanism adapted to apply and release the brakes by a positive fluid-pressure without releasing the fluid from the apparatus, the combination of a pair of fluid-pressure cylinders, a steam-cylinder, a piston in each cylinder, means for connecting all these pistons to move in unison, a valve mechanism, a steam-supply connected to said valve mechanism, a fluid-pressure supply connected to said valve mechanism, means for connecting the valve mechanism to the steam-cylinder, means for connecting the said valve mechanism to the fluid-pressure cylinders, and means for connecting the fluid-pressure cylinders to the brake mechanism, substantially as described.

7. In a fluid-pressure brake mechanism adapted to apply and release the brakes by a positive fluid-pressure, the combination of a pair of fluid-pressure cylinders, a steam-cylinder, a piston in each of said cylinders, means for connecting said pistons to move in unison, a rotary valve, a steam-supply, and a fluid-pressure supply connected to said valve, pipes connecting fluid-pressure cylinders and the steam-cylinder to said valve, and pipes connecting the fluid-pressure cylinders to the brake mechanism, whereby by rotating the valve steam may be admitted to either end of the cylinder and fluid under an equal pressure will be supplied to the fluid-pressure cylinders, substantially as described.

8. In a mechanism for operating fluid-pressure brakes, the combination of a pair of fluid-pressure cylinders, a steam-cylinder, a piston in each of said cylinders, a piston-rod connecting all of said cylinders, steam-supply pipes connected to the outer ends of said steam-cylinders, exhaust-ports formed therein near the center thereof, rings fitting the interior of said cylinder and normally closing said ports, springs to hold them yieldingly in position, said rings being engaged by the piston to open the exhaust-ports at the end of its stroke in either direction, means for admitting steam to either end of the steam-cylinder, and means for admitting fluid under pressure to the fluid-pressure cylinders, substantially as described.

9. In a fluid-pressure brake the combination of a brake-cylinder, a piston therein, fluid-pressure pipes connected to the cylinder on each side of the piston, means for increasing the pressure on either side of the piston in the brake-cylinder, a brake-operating mechanism connected to said piston, said mechanism consisting of a rotary cap, a cylindrical support therefor, means for moving the cap over the cylinder as it rotates, and means for applying or releasing the brakes by the movement of said cap, substantially as described.

10. In a brake, the combination of a rotary cap, a cylindrical support therefor, means connecting the cap to the cylindrical support whereby the rotation of the cap will move it to and fro over the support, means for rotating the cap, and means engaged by the cap for applying the brakes, substantially as described.

11. In a brake the combination of a rotary cap, a cylindrical support therefor, said support being formed with a spiral groove, a lug on the cap entering the groove, means for rotating the cap in either direction and means engaged by the cap for applying the brakes, substantially as described.

12. In a brake the combination of a brake-cylinder, a piston therein, fluid-pressure pipes connected to said cylinder on each side of the piston, means for coupling these pipes to corresponding pipes on adjacent cars, means at each end of the car for coupling the fluid-pressure pipes to another air-brake-operating mechanism, said means consisting of a coupling-pipe, a valve therein, branch pipes connecting this pipe to the fluid-pressure pipes, and a valve in one of said branch pipes, and a brake mechanism connected to the piston in the brake-cylinder.

13. In a brake the combination of a brake-cylinder, a piston therein, a brake mechanism operated by said piston, fluid-pressure pipes *e* and *f* connected to said cylinder, valves in the ends of these pipes, means for adapting this brake system to be connected to other forms of brake systems, said means consisting of a short central pipe at each end of the car, branch pipes connected to these central pipes and to the fluid-pressure pipes, a check-valve in the branch pipes connecting the central pipes to the brake-applying pipe *e*, whereby if the train should become detached accidentally air in pipe *f* would escape while air in pipe *e* would automatically apply the brakes, and hold them in their applied positions, substantially as described.

14. The combination of a brake-applying mechanism carried by each car, means for applying said mechanisms, an independent safety-brake-applying mechanism carried by each car, means for connecting each of said safety mechanisms to the adjacent brake-applying mechanism in such a manner that a pull on said safety mechanism will directly apply the brakes, and means for connecting the safety mechanism of one car to those on the adjoining cars, whereby should the train break in two the independent safety mechanism will apply the brakes, the means connecting said safety mechanisms of adjoining cars being capable of withstanding a strain sufficient to apply the brakes but of less strength than the safety mechanism proper so that the brakes will be applied before the connections between safety mechanisms are broken, substantially as described.

15. In a safety-brake the combination of a brake mechanism carried by each car, a cable carried by each car, means connecting said cable to the brake mechanism whereby the brake will be applied by a pull on said cable, means for holding the brakes in their applied position, said means being normally held out of engagement with the brake mechanism by the cable, means whereby a certain amount of longitudinal movement of the cable will cause said means to engage the brake mechanism, whereby a strain on the cable will apply the brakes and operate the mechanism for holding them in their applied position, substantially as described.

16. In a safety-brake the combination of a rotatable cap formed with ratchet-teeth on its outer surface, means for giving said cap a longitudinal movement during its rotation, a brake mechanism operated by said longitudinal movement of the cap, a cable carried by each car, said cable being connected to the rotatable cap whereby a longitudinal movement of the cable will rotate the cap, a pawl adapted to engage the teeth on the cap, means carried by the cable for normally holding said pawl out of engagement with said teeth and for dropping it on said teeth after the cable has moved a suitable distance, substantially as described.

In testimony whereof I affix my signature in the presence of two witnesses.

WILLIAM G. MacLAUGHLIN.

Witnesses:
FRANK S. REA,
G. B. LICHTENBERG.